United States Patent
Zhou et al.

(10) Patent No.: US 9,292,605 B2
(45) Date of Patent: Mar. 22, 2016

(54) METHOD OF USING A MOBILE TERMINAL TO IMPLEMENT CLOUD SEARCHING

(71) Applicant: HUIZHOU TCL MOBILE COMMUNICATION CO., LTD., Huizhou (CN)

(72) Inventors: Baozhong Zhou, Huizhou (CN); Kun Shen, Huizhou (CN); Guicheng Li, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 63 days.

(21) Appl. No.: 14/389,559

(22) PCT Filed: May 28, 2013

(86) PCT No.: PCT/CN2013/076354
§ 371 (c)(1),
(2) Date: Sep. 30, 2014

(87) PCT Pub. No.: WO2013/189230
PCT Pub. Date: Dec. 27, 2013

(65) Prior Publication Data
US 2015/0074758 A1   Mar. 12, 2015

(30) Foreign Application Priority Data
Jun. 18, 2012   (CN) .......................... 2012 1 0200646

(51) Int. Cl.
G06F 21/00   (2013.01)
G06F 17/30   (2006.01)
H04W 4/00   (2009.01)
(Continued)

(52) U.S. Cl.
CPC .... G06F 17/30864 (2013.01); G06F 17/30386 (2013.01); G06F 17/30893 (2013.01); G06F 17/30902 (2013.01); H04L 63/0428 (2013.01);
(Continued)

(58) Field of Classification Search
CPC ....................................................... G06F 21/31
USPC ............................................ 713/182; 726/17
See application file for complete search history.

(56) References Cited

U.S. PATENT DOCUMENTS

2006/0036582 A1* 2/2006 Sondergaard ..... G06F 17/30864
2007/0118533 A1* 5/2007 Ramer ............. G06F 17/30749
(Continued)

FOREIGN PATENT DOCUMENTS

| CN | 102404403 A | 4/2012 |
| CN | 102467524 A | 5/2012 |
| CN | 102724310 A | 10/2012 |

Primary Examiner — Christopher Brown
(74) Attorney, Agent, or Firm — Shimokaji IP

(57) ABSTRACT

A method of using a mobile terminal to implement cloud searching is provided. The method includes receiving, by the mobile terminal, searching conditions inputted by a user; executing, by the mobile terminal, local searching; and detecting whether networking is executed If networking is executed, the method includes detecting, by the mobile terminal, whether the local stores user account information; and connecting to a cloud server when the local of the mobile terminal stores the user account information. If networking is not executed, the method includes returning local searching results. The method further includes transmitting, by the mobile terminal, the searching conditions to the cloud server; and executing, by the cloud server, cloud searching according to the searching conditions; and returning searching results to the mobile terminal.

10 Claims, 2 Drawing Sheets

(51) Int. Cl.
*H04L 29/06* (2006.01)
*H04W 12/02* (2009.01)
*H04W 12/06* (2009.01)

(52) U.S. Cl.
CPC ............... *H04L 63/08* (2013.01); *H04W 4/003* (2013.01); *H04W 12/02* (2013.01); *H04W 12/06* (2013.01)

(56) References Cited

U.S. PATENT DOCUMENTS

2009/0209270 A1* 8/2009 Gutierrez ............ G06F 17/3087
 455/456.3
2011/0184936 A1* 7/2011 Lymberopoulos G06F 17/30902
 707/721

* cited by examiner

METHOD OF USING A MOBILE TERMINAL TO IMPLEMENT CLOUD SEARCHING

TECHNICAL FIELD

The present disclosure relates to the field of mobile communication technologies and, in particular, to a method of using a mobile terminal to implement cloud searching.

BACKGROUND

With the development of modern mobile communication technologies and mobile Internet, a mobile terminal may interact with a cloud server through SMS (Short Messaging Service, short message service) services or an Internet connection. At present, calculating and storage functions of mobile terminals have been greatly improved, so that the mobile terminals can store lots of information. However, due to such problems as information security and loss of mobile terminals, a user generally needs to store or backup personnel data in a remote server in addition to saving the personnel data in the local mobile terminal. When the user needs to look up data from the large amount of data stored on the mobile terminal or the remote server, effectively and quickly finding the information becomes a problem.

SUMMARY

In view of the defects of the prior art, the present disclosure provides a method for using a mobile terminal to implement cloud searching, which can effectively and quickly look up data stored on the mobile terminal and the cloud server.

A method of using a mobile terminal to implement cloud searching includes receiving, by the mobile terminal, searching conditions inputted by a user. The method also includes executing, by the mobile terminal, local searching and detecting whether networking is executed. If networking is not executed, returning local search results. If networking is executed, detecting, by the mobile terminal, whether the mobile terminal stores user account information, and connecting to a cloud server when the mobile terminal stores the user account information. The method further includes transmitting, by the mobile terminal, the searching conditions to the cloud server and executing, by the cloud server, cloud searching according to the searching conditions, and returning searching results to the mobile terminal.

According to the method of using a mobile terminal to implement cloud searching, after detecting whether the mobile terminal stores user account information and before transmitting searching conditions to the cloud server, the method for searching information further includes transmitting, by the mobile terminal, the local user account information to the cloud server to verify, and transmitting searching conditions to the cloud server after the local user account information passes the verification of the cloud server.

According to the method of using a mobile terminal to implement cloud searching, when the mobile terminal transmits the user account information to the cloud server, a preset encryption algorithm is adopted to encrypt and pack the user account information into a data packet and then transmit the data packet.

According to the method of using a mobile terminal to implement cloud searching, detecting whether the mobile terminal stores user account information further includes, when detecting that the mobile terminal does not store the user account information, displaying, by the mobile terminal: no upload history, whether to create a cloud account and try out the cloud server.

According to the method of using a mobile terminal to implement cloud searching, executing cloud searching and returning search results includes looking up all files stored by the user account in the cloud server, matching all the files stored by the user account according to the searching conditions and transmitting the matched files to the mobile terminal.

According to the method of using a mobile terminal to implement cloud searching, transmitting the matched files to the mobile terminal includes packing the matched files into a data packet by using a preset encryption algorithm and transmitting the data packet to the mobile terminal.

According to the method of using a mobile terminal to implement cloud searching, after executing cloud searching and returning search results, the method further includes displaying, by the mobile terminal, the local searching results and the cloud searching results on the same user interface.

According to the method of using a mobile terminal to implement cloud searching, transmitting searching conditions to the cloud server further includes, after the searching conditions are encrypted by using the preset encryption algorithm, packing, by the mobile terminal, the searching conditions into a data packet and transmitting the data packet to the cloud server and receiving, by the cloud server, the data packet, and decrypting the data packet by using a preset decryption algorithm.

According to the method of using a mobile terminal to implement cloud searching, the searching conditions include keywords and/or directories.

According to the method of using a mobile terminal to implement cloud searching, the preset encryption algorithm is an MD5 encryption algorithm.

Compared with the prior art, the method for using a mobile terminal to implement cloud searching, provided by the present disclosure, searches data on a mobile terminal and data on a cloud server simultaneously according to searching conditions, and searching results of the mobile terminal and the cloud server are displayed on the same user interface, so that data stored by a user can be searched effectively and quickly, thus bringing great convenience to the user. Moreover, the data is stored in the cloud server, and the user does not need to worry that the data may be lost. An encryption technology is adopted while transmitting files, thus improving the data transmission security.

DETAILED DESCRIPTION

To make the associated objective, technical solution and effects more clear, detail are described with reference to the drawings and exemplary embodiments. It should be understood that the specific embodiments described here are merely used for illustrative purposes and are not intended to limit the scope of the present claims in any way.

A method of using a mobile terminal to implement cloud searching is provided, which may be a method for looking up data based on local information search results of a mobile terminal and a cloud searching results carried out by a cloud server.

"Cloud" computing may relate to providing dynamic, easily-extensible and usually-virtualized, resources generally through relevant services using the Internet. "Cloud" is a metaphor related to networking and in particular, Internet based networking. Cloud based delivering and using modes of IT (Information Technology) infrastructure relate to obtaining desired resources according to an easily-extensible manner, on demand, through a network or through the Internet. Cloud based delivering and using modes of service relate to obtaining desired services according to an easily-extensible manner on demand through a network or through the Internet. Due to such factors as quickly increasing mobile users and aspects related to storage of information of mobile terminals, a number of servers are needed. Accordingly, cloud computing services may be adopted, thus being capable of effectively solving the elastic growing and bulk data processing capacity of dedicated servers.

Because the information of the users on a cloud server is involved, the unique number of the mobile terminals or SIM cards may be used as a unique number for each mobile terminal. However, if the unique number of the mobile terminal is used in accessing a cloud server, in case that the mobile terminal is in the hands of others, the information on the cloud server can be acquired without passing verification, thus causing lower information storage security. If a SIM card is used as the unique number, in cases where a user changes a SIM card, the information of the SIM card previously used by the user may be lost. Accordingly, a manner of registering or distributing username and password may be adopted to protect user account information on the mobile terminal and on a cloud server. Moreover, user verification information may be saved in the mobile terminal, and verification during each time of information acquisition is not required. Thereby, a user may make corresponding settings in case the mobile terminal is changed, so as to eliminate the user verification information stored on the mobile terminal.

Figure 1:
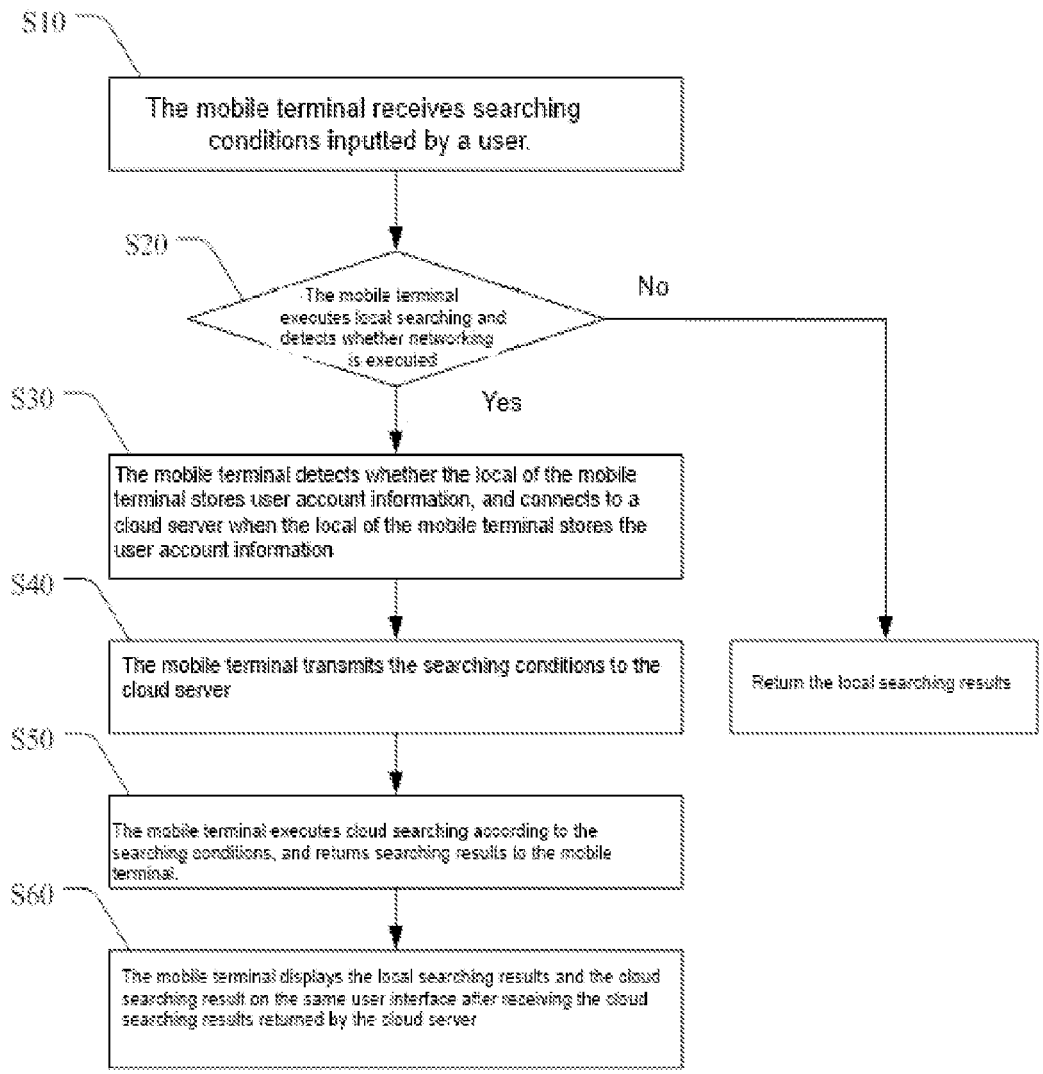
FIG. 1 depicts a flow chart of an example method of using a mobile terminal to implement cloud searching.

Referring now to FIG. 1, a method of using a mobile terminal to implement cloud searching may include a mobile terminal receiving searching conditions inputted by a user (block S10). The searching conditions may include keywords and/or directories. Keyword searching may relate to sequencing all or partial files names of information of a specific account stored on a cloud server according to an alphabetical order or stroke order, and then looking up the corresponding information. Directory searching may relate to separately storing information of a specific account stored on a cloud server under different directories according to file formats, wherein the directories may have lower directories and/or third-level directories. A cloud server may look up information under each directory according to the searching conditions. A method combining keyword searching and directory searching may be adopted to search files stored on a cloud server.

The mobile terminal may: execute local searching and may detect whether networking is executed (block S20). If networking is not executed, local searching may return local searching results. The number of files stored on a mobile terminal may not be as many as that stored on a cloud server, and may not need to be networked. Therefore, the local searching results may be returned faster than the cloud searching results. Therefore, when the mobile terminal displays the local searching results, cloud searching may be carried out at the backstage simultaneously. When the mobile terminal is not networked, the user may be prompted whether to turn on WIFI network or 3G network.

The mobile terminal may detect whether the mobile terminal stores user account information, and may connect to a cloud server when the mobile terminal stores the user account information (block S30). During implementation, when detecting that the mobile terminal does not store the user account information, the mobile terminal may display a message, such as "no upload history", and may prompt the user whether the user wants to create a cloud account and try out the cloud server. When detecting that the mobile terminal does not store the user account information, the mobile terminal may be connected to the cloud server. Then, the mobile terminal may receive the user account information uploaded by the user and may transmit the user account information to the cloud server to verify the user account information. When the user account information passes through the verification of the cloud server, the mobile terminal may transmit the searching conditions to the cloud server. When the user account information fails to pass through the verification, the mobile terminal may send a verification failure message to the user. When the mobile terminal transmits the user account information to the cloud server, a preset encryption algorithm may be adopted to encrypt the user account information, pack the user account information into a data packet and then transmit the user account information so as to increase the user information security. After the cloud server receives the encrypted data packet, the cloud server may decrypt the data packet by using a preset algorithm and then may execute corresponding treatment.

The mobile terminal may transmit the searching conditions to the cloud server (block 40). When the mobile terminal transmits the searching conditions to the cloud server, the mobile terminal may first encrypt the searching conditions by using a preset encryption algorithm, may pack the searching conditions into a data packet and then may transmit the data packet to the cloud server. Then the cloud server may receive the data packet, may parse the data packet and may decrypt the data packet by using a preset decryption algorithm.

The mobile terminal may execute cloud searching according to the searching conditions, and may return searching results to the mobile terminal (block S50). Specifically cloud searching and return of the searching results may include looking up, by the cloud server, all files stored by the user account in the cloud server firstly; matching all the files stored by the user account according to the searching conditions; and transmitting the matched files to the mobile terminal. Moreover, when the cloud server sends the matched files to the mobile terminal, the cloud server may also pack the matched files into a data packet and may transmit the data packet to the mobile terminal so as to ensure the data transmission security.

The mobile terminal may display the local searching results and the cloud searching result on the same user interface after receiving the cloud searching results returned by the cloud server (block S60). The mobile terminal may display the information on the local and on the cloud in a form of a list. A display page of the mobile terminal may include two parts. One part my display the storage result of the mobile terminal and that of the cloud server. Moreover, the searching results of the cloud server may be put behind the local searching results. The other part may display the total piece numbers of information.

Because local searching speed may be faster, the user interface may display the storage result of the mobile terminal very quickly, and acquire the cloud searching results simultaneously. At this time, the user interface may display a progress bar of the cloud searching to prompt the mobile terminal to acquire the cloud results.

User information security may be confirmed by encrypting the transmitted data, wherein the preset encryption algorithm may be an MD5 encryption algorithm or other encryption algorithm. The decryption algorithm may be an MD5 decryption algorithm or other corresponding decryption algorithm. In order to ensure the data security of the user, the data stored on the mobile terminal and on the cloud server may not be lost unless the data is artificially deleted. The user data may be stored after being encrypted in the cloud server, and may need to be decrypted before being displayed. Moreover, during querying, the transmitted searching conditions may carry the unique identification of the user simultaneously. In this way, the information returned by the cloud server may be the user information, and the case of returning other user information will not appear.

When the mobile terminal communicates with the cloud server, an https protocol may be used to verify such user account information as username, password and the like, and an http protocol may be used to transmit the searching conditions on the cloud server. The data may be transmitted in such data formats as json or xml, because json or xml data may meet variable data requirements. The mobile terminal may have corresponding parsing codes to parse the data in the mobile terminal and display the data to the user. Certainly, other protocols may be adopted when the mobile terminal communicates with the cloud server, and data transmission formats may also be adopted to transmit the data, which may not be limited.

Figure 2:
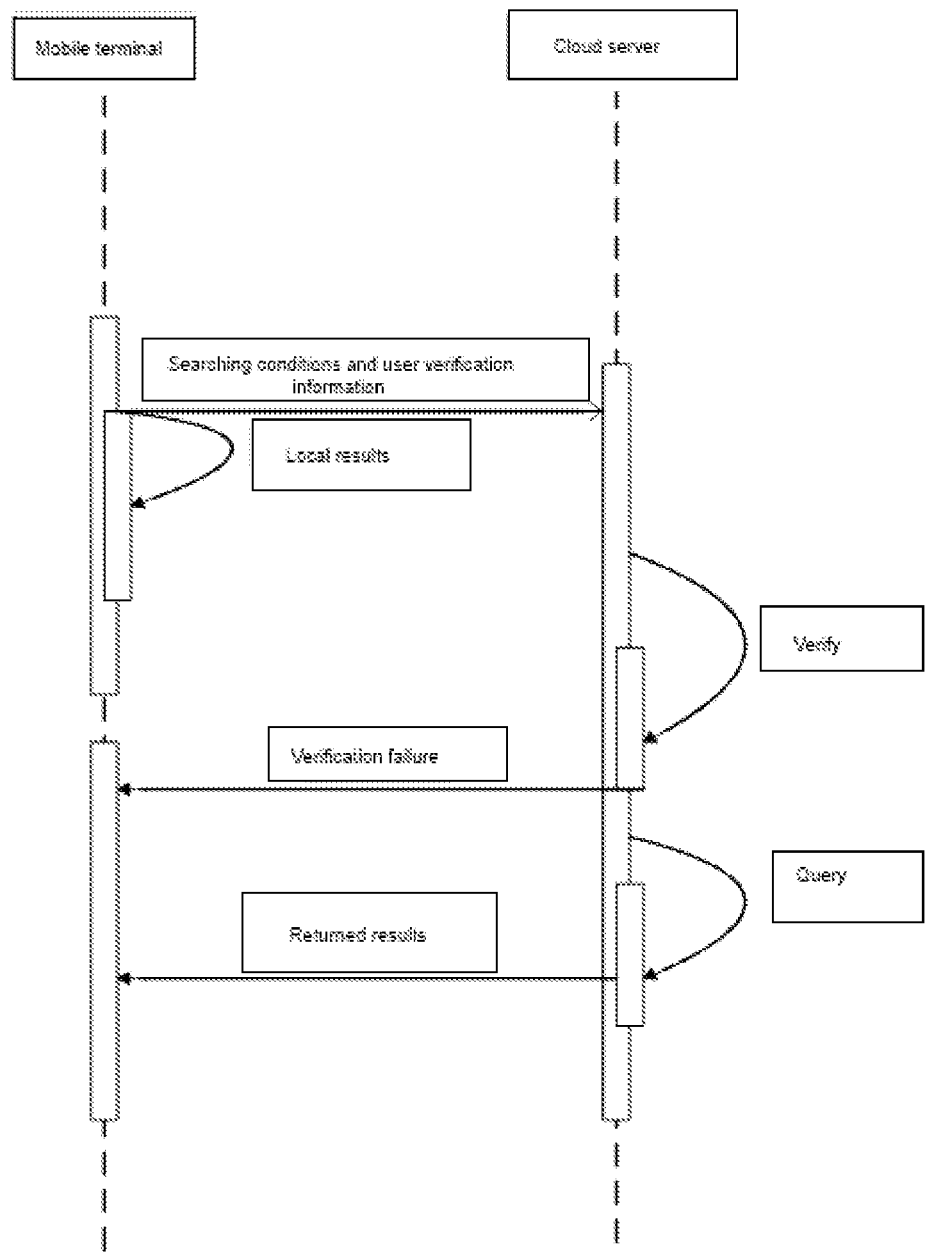
FIG. 2 depicts a sequence chart of an example method of using a mobile terminal to implement cloud searching.

For convenient understanding, the method of using a mobile terminal to implement cloud searching is described in detail with reference to the sequence chart depicted in FIG. 2, which may be content-based searching (the contents relating to short message and documents) and data-based searching.

Short Message-Based Content Searching Example:

It is supposed that a user Zhang San has an account number at the cloud: zhangsan, and the password is: 123. Moreover, the user has already uploaded a plurality of short messages and documents, and the user stores the short messages both on a mobile terminal and on a cloud server. When the user needs to search the short messages using keywords, the user may search on the mobile terminal and the cloud server through the following manner. First step: the user Zhang San may enable a searching function of the mobile terminal and may input keyword "hello" on the mobile terminal.

Second step: the mobile terminal may call the searching function of a local short message library to search whether the mobile terminal has any short messages containing "hello", and arrange and display the short messages according to the number of appearances and the positions in the short messages. Meanwhile, the mobile terminal may enable a network monitoring function to prompt the user whether to be networked. If the mobile terminal is not networked, a message "the device is not networked, whether to turn on WIFI or 3G network" may pop up and the local searching results of the mobile terminal are displayed.

Third step: when the mobile terminal is networked, because it is supposed that the mobile terminal has stored the username and the password, the username and the password may be directly encrypted via an MD5 or other encryption algorithm, then may be packed into a data packet and transmitted to the cloud server to verify the username and password. If the data packet fails to pass through the verification, a "verification failure" message prompt box may pop up.

Fourth step: after the data packet passes through verification, the mobile terminal may upload the searching conditions to the cloud server, namely the searching keyword "hello". Similarly, the keyword may be encrypted via MD5 or other encryption algorithms, packed into a data packet and then transmitted.

Fifth step: the cloud server may receive the searching conditions, may decrypt and may extract the searching keyword "hello". In the files uploaded by the user, the file storing the short messages may be looked up, the contents of the short messages may be extracted, and may be divided into short messages one by one. Then the characters and phrases of "hello" in all the short messages may be compared and matched. After the characters and phrases are successfully compared and matched, the successfully matched short messages may be marked.

Sixth step: the cloud server may record the number of all the short messages including "hello" according to the mark and the specific positions of the files in which the short messages are located. Moreover, the files may be packed into a data packet by using an encryption algorithm and transmitted to a mobile terminal having a specific identification of "Zhang San".

Seventh step: when the user Zhang San browses the short messages including the keyword "hello" at the mobile terminal, the mobile terminal may receive and may parse the data packet transmitted by the server at the backstage. The parsed results may be added behind the local results in a form of short message, and the mark of the results of the cloud server may be added behind the short message.

Although the storage formats of the documents and the short messages may be different on the cloud server, the process of searching documents and searching short messages may be basically the same. Therefore, it is not repeatedly described any longer.

Data-Based Content Searching Example:

The cloud server may add a date time identification on the uploaded file firstly. For example, for the file uploaded to the cloud server by the user Zhang San at 13:13:30 on 12 May 2012, Saturday, the cloud server may add a date time stamp behind the unique identifier of the file. For example, zhangsan20120512131330 is added at the tail end of the name of the file saved on the cloud server. The file format here may be decided according to the storage requirements of the cloud server on the file. Because the cloud server arranges all the stored files according to the dates, when the user Zhang San inputs the keywords "20120512" on the mobile terminal, the cloud server may extract all the stored files which include the user identification, the date and the time at the tail end of the file names. Whether the usernames are consistent may be compared first. Then, whether the date and the time are consistent may be compared. If the searching conditions are satisfied, all the files including 20100512 in the file names may be returned to the mobile terminal of Zhang San, and the returned results may be parsed and displayed through the mobile terminal.

To sum up, in the method of using a mobile terminal to implement cloud searching, data on the mobile terminal and data on the cloud server may be searched simultaneously according to the searching conditions, and the searching results of the local and the cloud server may be displayed on the same user interface, so that the data stored by the user can be searched effectively and quickly, thus bringing great convenience to the user. Moreover, the data may be stored in the cloud server, so that the user need not worry that the data may be lost. An encryption technology may be adopted while transmitting files, thus improving the data transmission security.

It should be understood that replacements or alternations may be made according to the technical solution and concept of the present disclosure. All these replacements or alternations shall fall within the scope of the appended claims.

The invention claimed is:

1. A method of using a mobile terminal to implement cloud searching, comprising:
   receiving, by the mobile terminal, searching conditions inputted by a user;
   executing, by the mobile terminal, local searching and detecting whether networking is executed; if networking is not executed, returning local searching results and prompting a user whether to turn on WIFI network or 3G network when the mobile terminal is not networked;
   if networking is executed, detecting, by the mobile terminal, whether the mobile terminal stores user account information, and connecting to a cloud server when the mobile terminal stores the user account information;
   transmitting, by the mobile terminal, the local user account information to the cloud server to verify the local user account information, and transmitting the search conditions to a cloud server after the local user account information passes the verification of the cloud server, wherein when the mobile terminal transmits the user account information to the cloud server, a preset encryption algorithm is adopted to encrypt and pack the user account information into a data packet and then transmit the data packet, the cloud server, after receiving the encrypted data packet, parses the data packet first, then decrypts the data packet by using a preset algorithm, and then carries out corresponding treatment;
   transmitting, by the mobile terminal, the searching conditions to the cloud server; and
   executing, by the cloud server, cloud searching according to the searching conditions, and returning searching results to the mobile terminal.

2. The method of using a mobile terminal to implement cloud searching according to claim 1, wherein detecting whether the mobile terminal stores user account information and connecting to a cloud server when the mobile terminal stores the user account information further comprises: when detecting that the local of the mobile terminal does not store the user account information, displaying, by the mobile terminal: no upload history, whether to create a cloud account and try out the cloud server.

3. The method of using a mobile terminal to implement cloud searching according to claim 1, wherein executing cloud searching and returning searching results specifically comprises:
   looking up all files stored by the user account in the cloud server;
   matching all the files stored by the user account according to the searching conditions; and
   transmitting the matched files to the mobile terminal.

4. The method of using a mobile terminal to implement cloud searching according to claim 3, wherein transmitting the matched files to the mobile terminal comprises: packing the matched files into a data packet by using a preset encryption algorithm and transmitting the data packet to the mobile terminal.

5. The method of using a mobile terminal to implement cloud searching according to claim 1, wherein after executing cloud searching and returning searching results, the method further comprises displaying, by the mobile terminal, the local searching results and the cloud searching results on the same user interface.

6. The method of using a mobile terminal to implement cloud searching according to claim 1, wherein transmitting the searching conditions to the cloud server further comprises:
   after the searching conditions are encrypted by using the preset encryption algorithm, packing, by the mobile terminal, the searching conditions into a data packet and transmitting the data packet to the cloud server; and
   receiving, by the cloud server, the data packet, and decrypting the data packet by using a preset decryption algorithm.

7. The method of using a mobile terminal to implement cloud searching according to claim 1, wherein the searching conditions comprise keywords and/or directories.

8. The method of using a mobile terminal to implement cloud searching according to claim 1, wherein the preset encryption algorithm is an MD5 encryption algorithm.

9. A non-transitory computer-readable memory storing instructions that, when executed by a processor, cause a mobile terminal to implement cloud searching, comprising:
   a searching conditions receiving module that, when executed by a processor, cause the processor to receive, by the mobile terminal, searching conditions inputted by a user;
   a networking detection module that, when executed by a processor, cause the processor to perform local searching of the mobile terminal and to detect whether networking is executed, prompting the user whether to turn on WIFI network or 3G network when the mobile terminal is not networked;
      if networking is executed, returning local searching results, wherein when the mobile terminal transmits the user account information to the cloud server, a preset encryption algorithm is adopted to encrypt and pack the user account information into a data packet and then transmit the data packet; the cloud server, after receiving the encrypted data packet, parses the data packet first, then decrypts the data packet by using a preset algorithm, and then carries out corresponding treatment;
   if networking is executed, detecting, by the mobile terminal, whether the mobile terminal stores user account information, and connecting to a cloud server when the mobile terminal stores the user account information;
   a user account information transmission module that, when executed by a processor, cause the processor to transmit local user account information to a cloud server to verify;
   a searching conditions transmission module that, when executed by a processor, cause the processor to transmit the searching conditions to the cloud server after the local user account information passes the verification of the cloud server; and
   a cloud searching module that, when executed by a processor, cause the processor to cloud search, according to the searching conditions, and returning searching results to the mobile terminal.

10. The non-transitory computer-readable memory according to claim 9, wherein cloud search, according to the searching conditions, and returning searching results to the mobile terminal comprises:
    looking up all files stored by the user account in the cloud server;
    matching all the files stored by the user account according to the searching conditions; and
    transmitting the matched files to the mobile terminal.

* * * * *